United States Patent [19]

Pharo, Jr.

[11] 4,083,031
[45] Apr. 4, 1978

[54] ACOUSTIC PRESENCE DETECTION METHOD AND APPARATUS

[75] Inventor: Lawrence C. Pharo, Jr., State College, Pa.

[73] Assignee: The United States of America as represented by the Secretary of the Navy, Washington, D.C.

[21] Appl. No.: 64,910

[22] Filed: Jul. 23, 1970

[51] Int. Cl.² ............................................. G08B 13/00
[52] U.S. Cl. ..................................... 340/5 R; 340/6 R
[58] Field of Search ................... 340/5 R, 6 R, 16 R, 340/15, 258 B, 258 D; 181/.5

[56] References Cited

U.S. PATENT DOCUMENTS

| 2,400,552 | 5/1946 | Hoover, Jr. | 340/6 R |
| 3,159,807 | 12/1964 | Asbury, Sr. | 340/6 R |
| 3,588,803 | 6/1971 | Fleming, Jr. et al. | 340/16 R |

Primary Examiner—Richard A. Farley
Attorney, Agent, or Firm—R. Sciascia; R. Beers; S. Sheinbein

[57] ABSTRACT

A method and means for passively detecting presence of noise radiating devices in a noise environment by determining the number of times per time sample that a received noise signal upwardly crosses a preselected threshold level, comparing this number with the number of upward crossings caused by a standard noise signal or background noise signal, and applying a predetermined ratio criteria. The noise sensors in the detection system may comprise a directional acoustic transducer in combination with an omnidirectional acoustic transducer, and acoustic transducer in combination with an artificially generated noise signal, or a single acoustic transducer.

12 Claims, 4 Drawing Figures

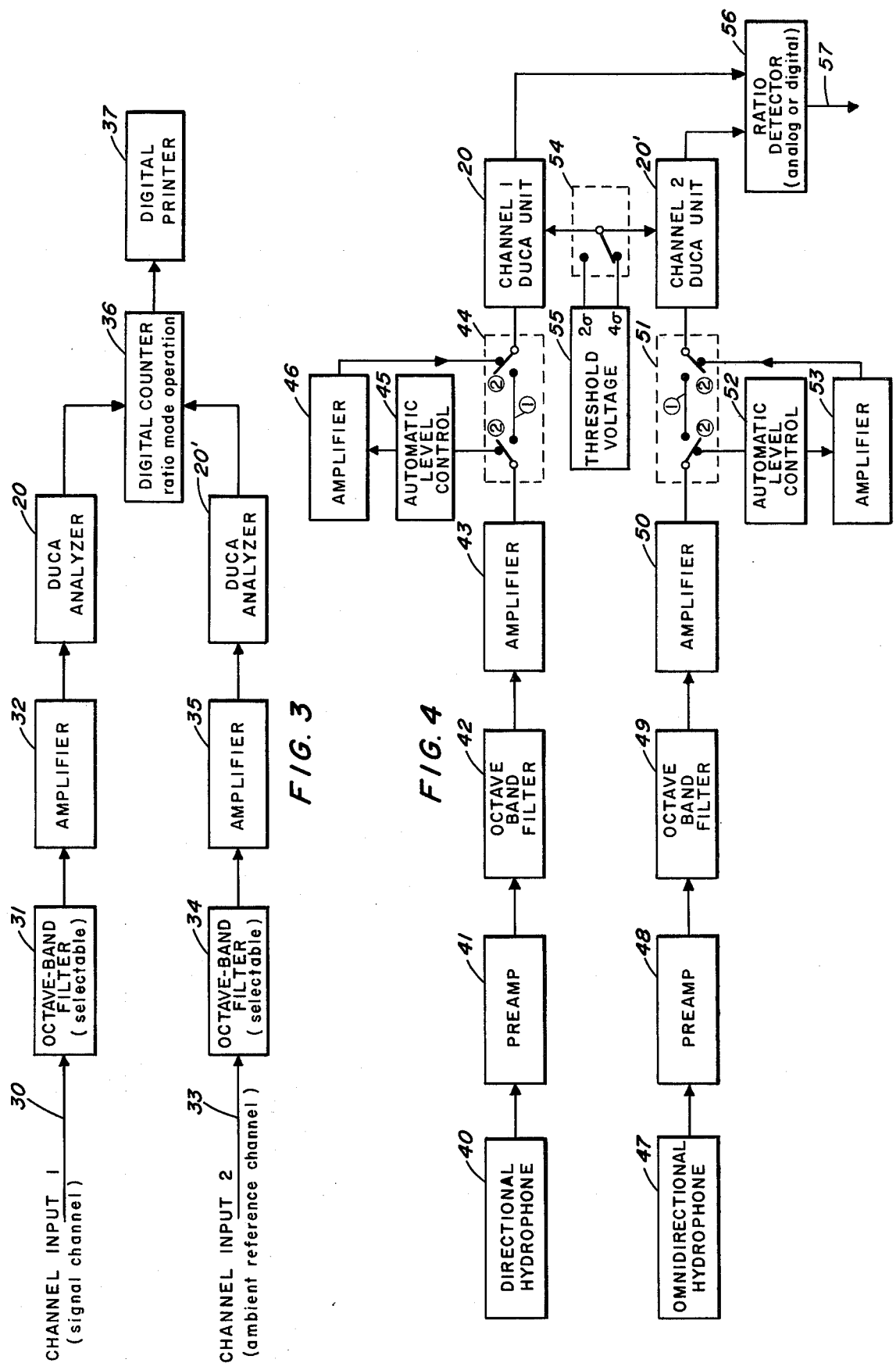

ACOUSTIC PRESENCE DETECTION METHOD AND APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains to the passive detection of radiated noise from water-borne vessels. More specifically, it relates to detecting the presence of water-borne vessels by means of counting the number of upward crossings of the radiated noise signal received per unit time that are above a preselected threshold level, and comparing said number of counts with the expected upward crossing rate of background noise or some other noise reference. Prior art passive detection devices such as sonar detection apparatus are not capable of distinguishing between and identifying the variety of noise signals being received. Prior art sonar detection devices are only capable of receiving and detecting coherent signals in a noise environment.

SUMMARY OF THE INVENTION

The present invention, however, utilizes the upward crossing distribution properties of the radiated noise signal of water-borne vessels as the detection indicia of the presence of such a vessel. By measuring the number of times per unit time that the received noise signal exceeds some previously selected threshold level in a positive going direction and comparing this number of crossings with the number of signal crossings to be expected for Gaussian noise at the corresponding signal levels, an indication is obtained, as to whether Gaussian noise alone or Gaussian noise plus a different noise signal is being received.

Detection of a noise generating vessel in a noisy environment by means of recognizing the characteristics of the noise generated by said vessel requires that a noise crossing profile of the noisy environment be readily available for comparison with the signal received. Also, characteristic noise profiles of the various classes of vessels to be detected should be available for identification purposes. These characteristic noise crossing profiles can be obtained by utilizing a portion of the circuitry of the present invention. Comparing a received noise signal with characteristic noise profiles would give an indication of the presence of a noise generating vessel along with some information as to its identity if desired, or an indication of no vessel presence in the area.

The detection method of this invention is structurally embodied in apparatus that can accomplish a comparison of background noise with detected noise in a reasonably short time. To simplify the apparatus of this invention, the method of this invention may be practiced by means of a single channel detection apparatus whereby comparison is made between the received non-Gaussian noise signal and a standard predetermined Gaussian background noise signal.

OBJECTS OF THE INVENTION

An object of this invention is to provide a reliable and uncomplicated passive method and means for acoustically detecting presence of a noise radiating device.

A further object of this invention is to provide a passive acoustic detecting method and means by determining and interpreting the received noise signal's upward crossings rate at a predetermined threshold level.

A still further object of this invention is to provide reliable and uncomplicated passive acoustic detection of water-borne devices.

Yet another object of this invention is to provide passive acoustic detection of water-borne devices by determining and interpreting the received signal's upward crossings rate at a predetermined threshold level.

BRIEF DESCRIPTION OF THE DRAWINGS

FIG. 3 illustrates a passive dual channel acoustic detection system.

FIG. 4 illustrates a passive dual channel acoustic detection system which is capable of operating in two different modes.

DESCRIPTION OF THE PREFERRED EMBODIMENT

Figure 1:
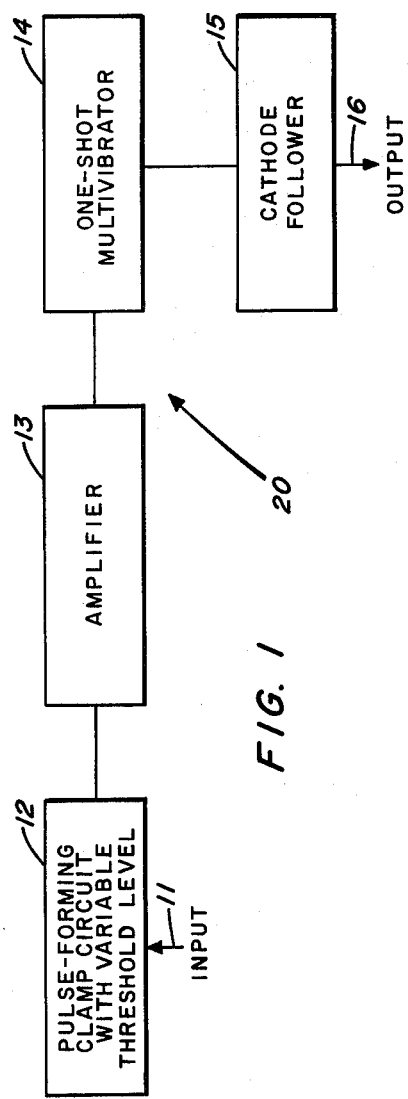
FIG. 1 illustrates the circuitry employed to determine the distribution of the received noise signal's upward crossings.

Referring first to FIG. 1; blocks 12 through 15 comprise the circuitry used for determining the distribution of upward crossings analysis of a received noise signal, which will hereafter be called DUCA. A noise signal for which the upward crossing statistics are to be determined is fed into pulse forming clamp circuit 12 at input 11. This circuit, by means of diodes or a combination of gates, in a manner well known in the art, generates a semi-square wave signal whenever a noise signal above a pre-set threshold level occurs at input 11. The predetermined threshold level, as is well known in the art, is established by biasing one of the elements in the clamp circuit. This bias may be varied by means of a variable biasing resistance element in the circuit. The semi-square wave signal of pulse clamp circuit 12 is then amplified by amplifier 13 and used to trigger a one shot multivibrator 14 which provides a constant amplitude pulse everytime an upward crossing of the predetermined threshold level occurs. One-shot multivibrator 14 may be any multivibrator known in the art adaptable to the use described. Cathode follower 15 is used simply to provide a low output impedence. It can thus be seen that the DUCA circuit 20 operates to indicate the number of times per unit time that an input noise signal exceeds the preselected threshold value of pulse forming clamp circuit 12.

Figure 2:
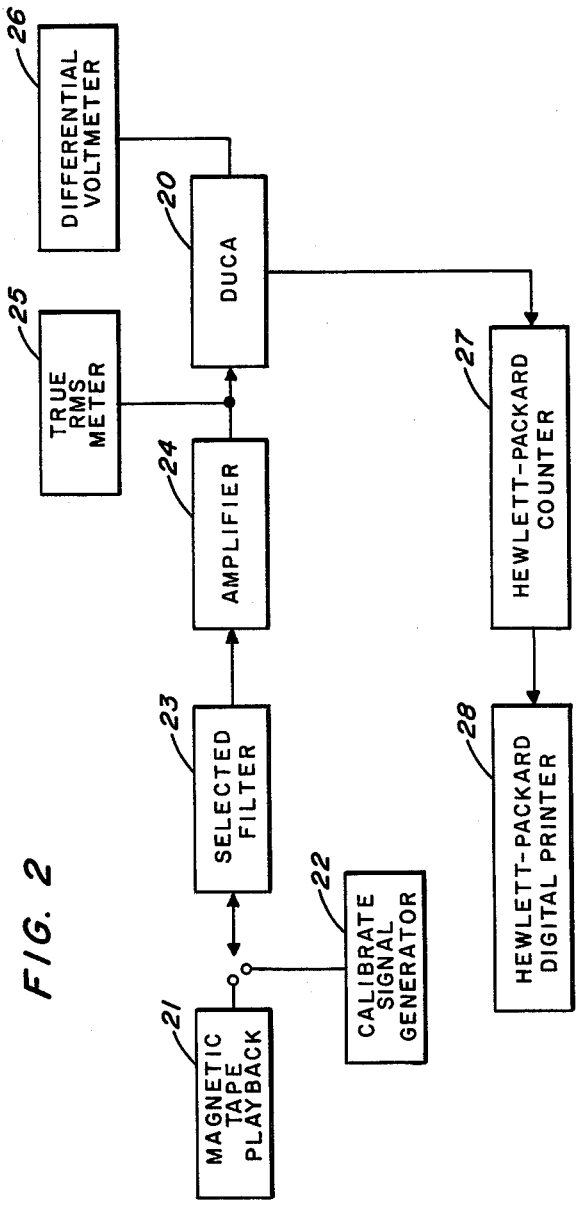
FIG. 2 illustrates a manner of using the circuits of FIG. 1 to analyze the distribution of upward crossings of the received noise signal.

Referring now to FIG. 2. A DUCA analysis system which utilizes the DUCA circuitry of FIG. 1 is shown. The noise signal to be analyzed may be received from a magnetic tape such as 21 or any sound transducer of the airborne or water-borne type. Before a noise signal is analyzed, signal generator 22 is used to set up the DUCA circuitry. With the variable threshold level of pulse forming clamp circuit 12 of FIG. 1 set at one of the plurality of threshold levels and selected filter 23 set to one of the plurality of frequency bands available, a sine wave signal of known RMS value from signal generator 22 is applied to selected filter 23 and the gain of DUCA amplifier 24 is adjusted so that the peak of the sine wave exceeds the value of the selected threshold level by the small amount necessary for amplifier 13 to drive the multivibrator 14 to full output. A series of constant level pulses then appear at the output of DUCA analyzer 20 at the same frequency as that of the input signal. Differential volt meter 26 is used to accurately set the values of threshold level. The radiated noise signals to be analyzed by the system of FIG. 2 are then fed to filter 23 which selectively provides a plurality of band pass filters. Amplifier 24 is used to bring the output of selected filter 23 up to the level of 4 volts RMS, as determined by the RMS meter 25. The normal input signal level to DUCA analyzer 20 is 4 volts RMS and the threshold level voltages in the analyzer are in increments of 4 volts. The threshold level voltages are normally maintained in increments of the input RMS voltage for adequate resolution when plotting the results. Other threshold level voltages or input voltage levels can be used, however, the peak to RMS factor of the noise signal being analyzed must be considered when choosing these voltages. The output of DUCA 20 is a series of constant level pulses that corresponds to the number of times the input signal has exceeded the selected threshold value. These pulses are counted by electronic counter 27 and the results are printed by digital printer 28. One-second and 10-second counting times of the counter have been used exclusively in the contemplated embodiments.

To obtain a complete profile of the upward crossings of a noise signal, the threshold level of DUCA 20 is varied through its range until a threshold level is reached at which the output of DUCA 20 is zero for each selected frequency band of selected filter 23. A profile of upward crossings per unit time is thus determined for various frequency bands and threshold levels. This is an accurate way of characteristically describing one parameter of an unknown noise signal. This characteristic parameter facilitates comparing noise signals by comparing their characteristic profiles.

Utilization of the DUCA technique has shown that submarine and surface ships and other water-borne vessels radiate noise signals that are usually less Gaussian than the ocean's ambient noise. Consequently, these radiated noise signals are detectable because the distribution of signal crossings of the ambient noise is modified by the presence of the radiated noise signal. The degree of modification is a function of the signal to noise ratio, the class of the vessel, the speed and depth of the vessel, and the direction angle of the vessel.

The two general methods of employing the DUCA system for detection of noise generating vessles are, detection by characteristics and detection by level change.

Detection by level change is most effectively utilized for long ranges. The upward crossings of long range generated noise in combination with background noise increases not only if the long range signal becomes more non-Gaussian but also if there is an increase in the level of the received signal, assuming that there is no automatic gain control at the input to the DUCA system. A signal level increase lowers the effective DUCA threshold and a resulting increase in the number of signal crossings indicates a target. In this operating mode, the DUCA performance is equivalent to an energy detector and similar in results to a square law detector.

Detection by characteristics is most effective at medium and short ranges and is based on the probability distribution of the noise. A prudent selection of the frequency bands and threshold levels used can produce a more positive indication of the nature of the noise source. An automatic level control device is used at the DUCA input in this mode since the standard deviation of the noise must be held constant when measuring the probability distribution.

Referring now to FIG. 4. A DUCA detection system is shown which is capable of operating in two detection modes, that of level change and characteristics. The mode of operation of the system of FIG. 4 is changed from a level detection mode to a characteristics detection mode by means of changing the position of switchs 44 and 51 from 1 to 2 respectively. This places automatic level controls 45 and 52 and amplifiers 46 and 53 into the circuit. When these components are in the circuit, the system is working the characteristics detection mode. By removing these respective level control components, the system will operate in the level change detection mode. In the operational system of FIG. 4, octave-band filters 42 and 49 would consist of several preselective octave bands which have previously been determined as providing optimum detection possibility. The same criteria is applied to the multiplicity of threshold levels available for DUCA 20.

When the DUCA detection system of FIG. 4 is to be operated in the detection by characteristics mode, switches 44 and 51 are in the position indicated in the FIGURE. In this mode, in order to be able to detect a vessel that is radiating noise, the ambient or background noise is optimally Gaussian and the noise radiated by the vessel must be comparatively non-Gaussian. The omnidirectional hydrophone 47, which may be either a hydrophone or any other type of omnidirectional sound transducer, receives the ambient or background noise. Preamplifier 48 amplifies the signal received to a suitable level to be filtered by octave-band filter 49. The filtered signals are amplified by amplifier 50 and maintained at a constant RMS value by level control 52 and amplifier 53. This signal is fed into channel 2 DUCA unit 20'. Directional hydrophone 40, or any other type of directional sound transducer, receives a noise signal generated from a certain area within the volume monitored by the detection system. This signal is amplified by preamplifier 41, passes through octave-band filter 42, and is further amplified by amplifier 43. Its RMS value is maintained at a constant level by level control 45 and amplifier 46 in which state it is fed into channel 1 DUCA unit 20. The threshold level of both channel 1 and channel 2 DUCA units 20 and 20' respectively are controlled by threshold voltage control 55 which is capable of supplying a threshold value of two times or four times the RMS level input to the two DUCA units. It has been experimentally determined that the best detectability is achieved when the DUCA threshold setting is about twice the input level, independent of the octave-band filter setting. The outputs of DUCA unit 20 and DUCA unit 20' are fed to a ratio detector 56 which compares the output signals from the two DUCA units. If a predetermined ratio of the two outputs is exceeded, it produces output 57 which indicates a detection. By experimentation, it has been determined that a two to one ratio of output pulses from DUCA unit 20 to pulses from DUCA unit 20' is more than adequate for indicating presence of a noise generating vessel. Satisfactory performance has been attained at much lower output pulse ratios.

When the detection system of FIG. 4 is to be utilized in the level change mode, switches 44 and 51 are actuated so as to be in contact with position 1, thus, effectively, leaving the automatic level controls out of the circuit. If there is no significant biological noise present in the environment, it is reasonable to expect that the overall background level will be quite stable over a period of at least several minutes. A vessel approaching the local noise field from a great distance will eventually contribute enough noise to raise the overall noise level a preceptable amount. This level increase can be sensed by the system of FIG. 4 even though the overall noise distribution is very nearly Gaussian. A level increase means an increase in the RMS input to DUCA 20. Remembering that the relative DUCA threshold is the fixed threshold voltage divided by the RMS input level, a decreased relative threshold is achieved. The resulting increase in the number of signal crossings indicates a target. It has been determined, by experimentation, that an adequate detection threshold is a ratio of less than two to one for output from DUCA unit 20 to output from DUCA unit 20'. In all other respects, the DUCA system will operate in the same manner as if it were in the characteristics detection mode.

Referring now to FIG. 3. A dual channel detection system is shown that may be easily converted into a single channel system by removing one of the channels.

The dual channel operation of the system is as follows. A noise signal plus ambient or background noise received at input 30 is fed through octave-band filter 31 through amplifier 32 to DUCA 20 which produces pulses corresponding to the number of times the input signal exceeds a preselected threshold level. These pulses are counted by digital counter 36. Channel 2 receives at its input 33, an ambient reference signal or the ambient background noise of the environment being monitored. This signal is passed through octave-band filter 34 and amplifier 35 and analyzed by DUCA analyzer 20'. The pulses created by DUCA analyzer 20' are fed to digital counter 36 which counts the pulses so produced. Digital counter 36 may operate in a ratio mode, whereby its output is a measure of the ratio of the channel 1 pulses to the channel 2 pulses per unit time. The output of digital counter 36 is printed by digital printer 37.

The single channel embodiment operates in the following manner. A noise signal would be received at input 30 for example, processed through octave-band filter 31, amplifier 32, DUCA analyzer 20, and digital counter 36, which would now be operating in a standard counting mode, thereby counting the number of times the input signal crosses the predetermined threshold of DUCA 20 per unit time. These counts are then recorded by digital printer 37. Or, such resultant count could be electronically compared to a predetermined standard which would then indicate whether or not a detection has been made. As can be seen channel 2 is not necessary in this embodiment.

Obviously, many modifications and variations of the present invention are possible in the light of the above teachings. It is therefore to be understood that within the scope of the appended claims the invention may be practiced otherwise than as specifically described.

What is claimed is:

1. A passive acoustic detection system for detecting noise radiating devices in a noise environment comprising:
   a first acoustic transducer responsive to acoustic signals in its environment;
   a source of acoustic signals producing signals representative of noise in the environment of said first transducer;
   a first octave-band frequency filter connected to said first transducer for permitting passage of only one band of frequencies;
   a second octave-band frequency filter connected to said source of acoustic signals for permitting passage of only one band of frequencies;
   a first automatic level control circuit responsive to the output signal from said first band filter to provide a constant root mean square level for the output signal from said first band filter;
   a second automatic level control circuit responsive to the output signal from said second band filter to provide a constant root mean square level for the output signal from said second band filter;
   a first pulse-forming clamp circuit, having a selectably variable threshold level, responsive to the output of said first level control circuit for providing a pulse whenever said threshold level is exceeded;
   a first means responsive to the output of said first pulse-forming clamp circuit to provide a constant amplitude pulse signal every time said first pulse-forming circuit generates a pulse;
   a second pulse-forming clamp circuit, having a selectable variable threshold level, responsive to the output of said second level control circuit for providing a pulse whenever said threshold level is exceeded;
   a second means responsive to the output of said second pulse-forming clamp circuit to provide a constant amplitude pulse signal every time said second pulse-forming circuit generates a pulse;
   a ratio detector responsive to the output of said first and second means for measuring the ratio of the pulses from said first means to the pulses from said second means;
   whereby a presence is detected if the ratio of pulses from said first means to said second means equals or exceeds a predetermined amount.

2. The detection system of claim 1 wherein said first acoustic transducer comprises a hydrophone.

3. The detection system of claim 1 wherein said first and second octave-band frequency filters selectively provide a plurality of optimized frequency pass bands as determined by the DUCA characteristics of the radiated noise signal.

4. The detection system of claim 3 wherein said first acoustic transducer comprises a hydrophone.

5. The detection system of claim 1 wherein said source of acoustic signals comprises a second acoustic transducer responsive to acoustic signals in its environment.

6. The detection system of claim 5 wherein said first acoustic transducer comprises a directional acoustic transducer and said second acoustic transducer comprises an omnidirectional transducer.

7. The detection system of claim 6 wherein said first and second automatic level control circuits are disposed so as to be switchably inserted and removed from in between the respective said octave-band frequency filters and said pulse forming clamp circuits.

8. The detection system of claim 7 wherein said directional acoustic transducer comprises a directional hydrophone and said omnidirectional transducer comprises an omnidirectional hydrophone.

9. The detection system of claim 7 wherein said first and second octave-band frequency filters selectively provide a plurality of frequency pass bands.

10. The detection system of claim 9 wherein said directional acoustic transducer comprises a directional hydrophone and said omnidirectional transducer comprises an omnidirectional hydrophone.

11. A method for detecting the presence of noise generating devices in a noise environment comprising the steps of:

monitoring the environment for acoustic signals by a transducer having directional sensitivity and a transducer having omnidirectional sensitivity;

transducing the directionally monitored acoustic signals into electrical signals in a first channel;

transducing the omnidirectionally monitored acoustic signals into electrical signals in a second channel;

filtering the electrical signals in the first channel by a first adjustable band pass filter;

filtering the electrical signals in the second channel by a second adjustable band pass filter;

generating a pulse signal every time the amplitude of the transduced electrical signal in the first channel exceeds a predetermined threshold value;

generating a pulse every time the amplitude of the transduced electrical signal in the second channel exceeds the same predetermined threshold value;

counting the number of times a pulse signal is generated in the first channel in a predetermined time period;

counting the number of times a pulse signal is generated in the second channel in the same predetermined time period.

comparing the count in the first channel with the count in the second channel;

indicating detection of a noise generation device if the count in the first channel exceeds the count in the second channel by a predetermined ratio.

12. The method of claim 11 wherein the filtered electrical signals in the first channel are kept at a constant predetermined root mean square level before the step of generating a pulse signal in the first channel; and the filtered electrical signals in the second channel are kept at a constant predetermined root mean square level before the step of generating a pulse signal in the second channel.

* * * * *